T. HORNE & D. C. SMITH.
HARROW ATTACHMENT FOR CULTIVATORS.
APPLICATION FILED AUG. 7, 1909.
947,910.
Patented Feb. 1, 1910.
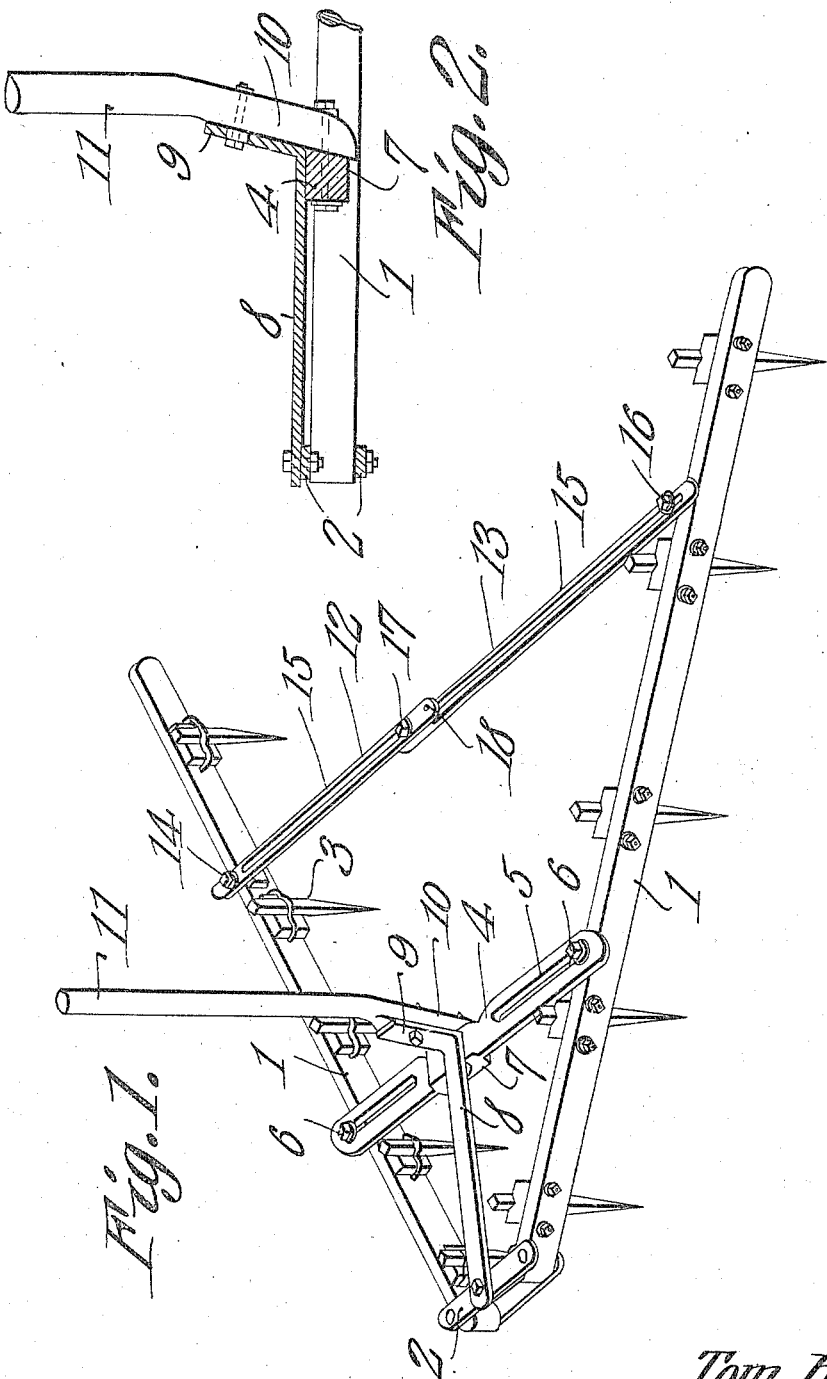

UNITED STATES PATENT OFFICE.

TOM HORNE AND DENTON C. SMITH, OF McGREGOR, TEXAS.

HARROW ATTACHMENT FOR CULTIVATORS.

947,910.   Specification of Letters Patent.   Patented Feb. 1, 1910.

Application filed August 7, 1909. Serial No. 511,795.

*To all whom it may concern:*

Be it known that we, TOM HORNE and DENTON C. SMITH, citizens of the United States, residing at McGregor, in the county of McLennan, State of Texas, have invented a new and useful Harrow Attachment for Cultivators, of which the following is a specification.

This invention relates to a harrow attachment for cultivators, one of its objects being to provide a simple, durable and efficient device of this character which can be readily attached to a cultivator beam in lieu of an ordinary shovel standard.

Another object is to provide an attachment which can be quickly adjusted to different widths, the parts being held together by simple means provided for that purpose.

Another object is to provide novel means for connecting the standard to the front portion of the harrow so as to transmit all strains directly to the front end.

With these and other objects in view, the invention consists in certain novel details of construction and the combinations of parts hereinafter more fully described and pointed out in the claim.

In the accompanying drawings the preferred form of the invention has been shown.

In said drawings:—Figure 1 is a perspective view of an attachment embodying the present improvements. Fig. 2 is a vertical longitudinal section through the front portion of the attachment.

Referring to the figures by characters of reference, 1 designates side bars having their front ends spaced apart and connected by means of upper and lower links 2 which are pivotally attached thereto. Each of the bars 1 has a series of harrow teeth 3 fastened to it in any preferred manner.

A cross bar 4 is mounted on the front portions of the side bars 1 and is provided near its ends with longitudinal slots 5, each of which is designed to receive a clamping bolt 6 engaging one of the side bars. By tightening these bolts the cross bar 4 can be held against movement relative to the side bars and by loosening them, the side bars can be swung toward or away from each other until the limits of their movements have been attained. The middle portion of the bar 4 is thickened as at 7 and supports one end portion of a strap 8. The front end of this strap is bolted to the links 2 while the rear end thereof has an upstanding portion 9 bolted to the flattened lower end 10 of a standard 11. This flattened end 10 is also bolted to the thickened portion 7 and it will be apparent therefore that the standard thus serves to hold the cross bar 4 and the strap 8 properly connected together.

The rear portions of the side bars are connected by links 12 and 13. One of these links is pivotally connected to one of the side bars by means of a bolt 14 and both of the links are provided with longitudinal slots 15. A bolt 16 extends through the slot in link 13 and engages one of the side bars, the lapping portions of the two links being also connected by a bolt 17 which extends through the slots. A guide stud 18 projects from the link 12 and is designed to travel in the slot in link 13. Obviously, by tightening all of the bolts 14, 16 and 17, the links can be securely fastened together and to the side bars, while, by loosening the bolts, they can be adjusted longitudinally to permit the side bars 1 to be shifted toward or from each other.

The attachment herein described is used by placing the standard 11 in one of the cultivator beams in lieu of a shovel standard. The side bars 1 are then adjusted toward or from each other to regulate the width of the harrow, this adjustment being effected by the means hereinbefore described. When the harrow is drawn forward, the standard 11 pushes against the cross bar 4 and also against the strap 8, this strap transmitting the pressure to the links 2 and these, in turn, pulling on the side bars 1. It will be seen therefore, that none of the parts except the standard 11 are subjected to any strains which would tend to break them. By connecting the side bars in the manner shown and described, the entire attachment can be folded into a compact body when not in use.

It is to be understood, of course, that various changes may be made in the construction and arrangement of the parts without departing from the spirit or sacrificing the advantages of the invention.

What is claimed is:—

A harrow attachment for cultivators, consisting of rearwardly diverging side bars, links connecting the front ends of said bars, adjustably connected links constituting connections between the rear portion of the side bars, a cross bar adjustably connected to each of the side bars at points between the front and rear links, said cross bar having a central thickened portion, a strap secured upon the upper front link and resting on the thickened portion of the cross bar, said strap having an upstanding rear portion, a standard secured to said upstanding portion of the strap and to the thickened portion of the cross bar, said standard constituting the sole connection between the strap and bar, and tilling devices connected to the side bars.

In testimony that we claim the foregoing as our own, we have hereto affixed our signatures in the presence of two witnesses.

TOM HORNE.
DENTON C. SMITH.

Witnesses:
CHAS. O. JONES,
JNO. S. PATTERSON.